Feb. 18, 1958  S. SENSIPER  2,824,288
FERRITE ROTATOR
Filed May 2, 1955  2 Sheets-Sheet 1
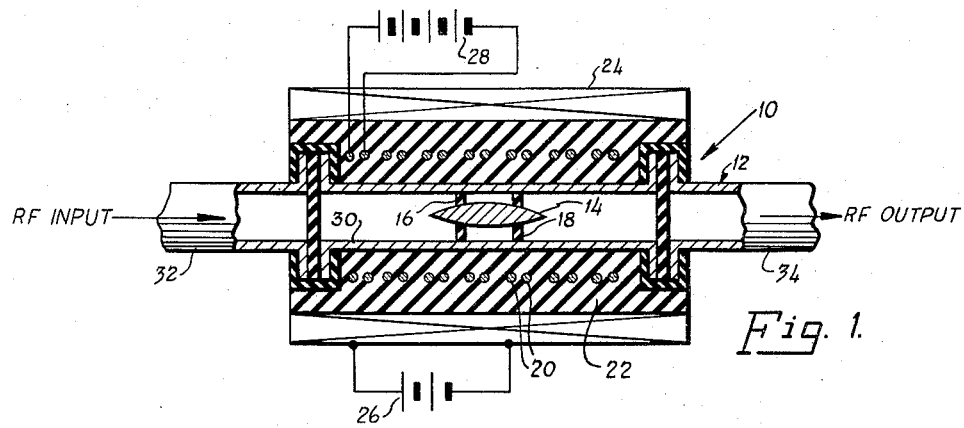
Fig. 1.
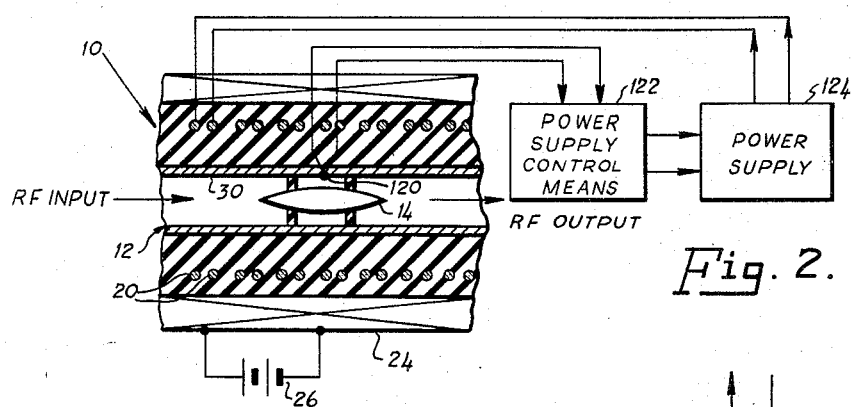
Fig. 2.
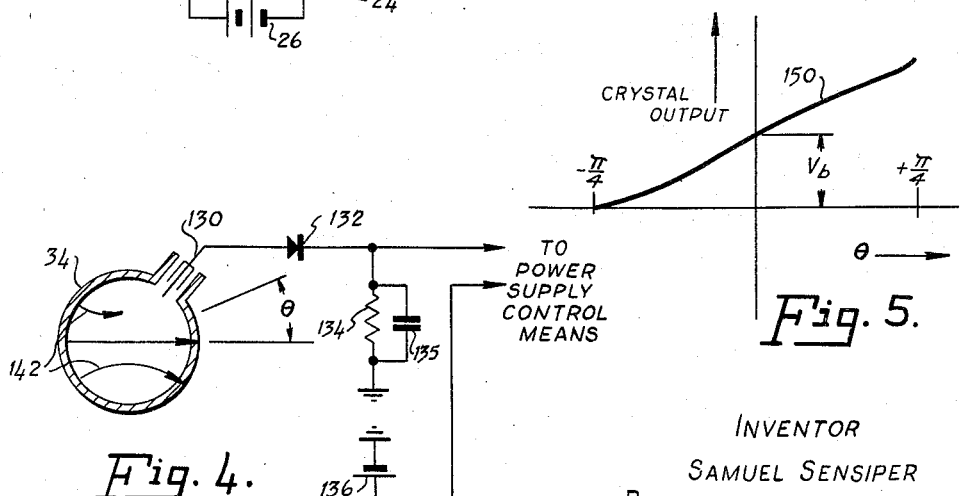
Fig. 4.
Fig. 5.
INVENTOR
SAMUEL SENSIPER
By
Henry Heyman
ATTORNEY INVENTOR
SAMUEL SENSIPER
BY Henry Heyman
ATTORNEY

2,824,288

FERRITE ROTATOR

Samuel Sensiper, Los Angeles, Calif., assignor to Hughes Aircraft Company, Culver City, Calif., a corporation of Delaware Application May 2, 1955, Serial No. 505,328

5 Claims. (Cl. 333—17)

This invention relates to electromagnetic propagation structures and more particularly to a device for rotating the plane of polarization of an electromagnetic wave.

A ferromagnetic ceramic body commonly known as a ferrite is often employed to rotate the plane of polarization of a linearly polarized electromagnetic wave. To this end, a ferrite body is disposed within a waveguide which is excited in a suitable manner to propagate circularly polarized waves. A unidirectional axial magnetic field is maintained throughout the ferrite body and the rotation of the plane of polarization is produced by an effect known as the Faraday effect. The combination of the ferrite body, the waveguide, and the magnetic field producing means is commonly called a ferrite rotator. Such a rotator is described and claimed in copending application, Serial No. 419,259, entitled "Waveguide Isolator," filed March 29, 1954, by W. A. Hughes, and assigned to the assignee of the present invention.

The amount of rotation produced by a ferrite rotator is a function of axial magnetic field strength. However, maximum rotation is generally desired and for this reason a ferrite is normally operated at saturation. At the field strength required to produce saturation and at field strengths substantially above that required to produce saturation, attenuation is encountered within a certain frequency range because of a phenomenon which is a well-known property of a ferrite. In such a case, the precession of an electron in the crystalline structure of a ferrite causes an absorption of energy by the ferrite from the fields of the wave passing through it. The condition of power absorption is described as ferromagnetic resonance or gyro-resonance. Power loss near gyro-resonance decreases as the frequency of the propagated wave departs from the frequency at which maximum attenuation occurs. However, for certain frequencies, notably the S-band which is near 3000 megacycles per second, the strength of the magnetic field required to produce a practical amount of rotation in a ferrite rotator is very close if not equal to the field strength required to produce gyro-resonance at the S-band. At present, no known method has been devised to overcome this limitation of a ferrite rotator.

It is, therefore, an object of the invention to provide an improved ferrite rotator.

It is another object of the invention to provide a practical ferrite rotator for operation at the S-band.

For the particular case of the elongated rod-shaped ferrites, which are currently employed in rotators, it is known that the frequency at which maximum attenuation occurs in a ferrite decreases with the saturation magnetization of the ferrite. It is also known that the saturation magnetization of a ferrite decreases with temperature. In accordance with the invention, a ferrite body is appropriately positioned inside of a waveguide and a uniform axial magnetic field is maintained within the ferrite body throughout its length as in the case of conventional ferrite rotators. However, means are provided in addition to heat the ferrite body to reduce its saturation magnetization whereby the frequency at which maximum attenuation occurs may be reduced to a value substantially below the S-band.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Fig. 1 is a sectional view of a ferrite rotator incorporating the present invention;

Fig. 2 is a sectional view of a ferrite rotator provided with automatic temperature control means in accordance with the present invention;

Fig. 4 is a sectional view on the line 4—4 of Fig. 3;

Fig. 5 is a graph characteristic of the operation of the temperature control means of Fig. 3;

Figure 3:
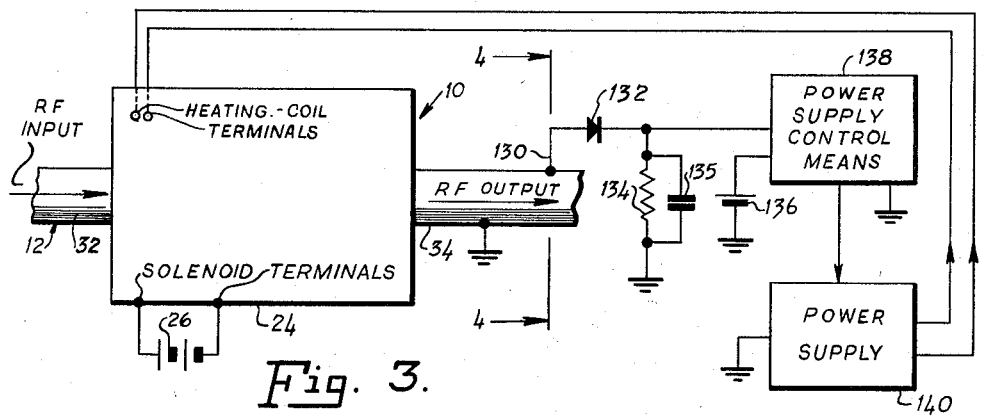
Fig. 3 is a schematic representation and circuit diagram of a ferrite rotator incorporating the present invention provided with automatic temperature control means which respond to changes in the rotation of a wave passing through the rotator.

Referring to the drawings, a ferrite rotator 10 is shown in Fig. 1 comprising a cylindrical waveguide 12 in which a ferrite body 14 is centrally positioned by two dielectric supporting discs 16 and 18. A non-inductive wound heating coil 20 is then disposed about the waveguide 12 within a ceramic insulating cylinder 22. Disposed outside of and contiguous to the insulating cylinder 22 is a solenoid 24 which is employed to produce an axial magnetic field through the ferrite body 14. Solenoid 24 is accordingly supplied with direct current by a potential source 26. Heating coil 20 is supplied with direct current by means of a heating source of potential 28.

The central portion 30 of the waveguide 12 is insulated, for example, by dielectric discs as shown from two separate input and output portions 32 and 34 respectively, although this need not necessarily be done if temperatures employed within the central portion 30 of the waveguide 12 are not too high and do not disturb the operation of adjacent equipment or equipment connected to the input and output portions 32 and 34 of the waveguide 12.

The operation of the ferrite rotator 10 is exactly the same as that of ferrite rotators of the prior art except that ferrite rotator 10 may be used at the S-band where generally substantial attenuation is produced by the absorption of energy by the ferrite body 14. Accordingly, the heating coil 20 heats the central portion 30 of the waveguide 12 and the ferrite body 14. It is known that the saturation magnetization of the ferrite body 14 will decrease with an increase in the temperature of the ferrite body 14, hence, the saturation magnetization of the ferrite body 14 is reduced by the heating produced by the heating coil 20. The resulting decrease in the saturation magnetization of the ferrite body 14 produces an incumbent reduction in the frequency at which maximum attenuation occurs within the ferrite rotator 10 for a given field strength produced by the solenoid 24 in conjunction with potential source 26. By heating the ferrite body 14 to an appropriate temperature, the frequency at gyro-resonance where substantial attenuation occurs within the ferrite rotator 10 may be reduced to a value substantially below the operating frequency, e. g. the S-band, of the ferrite rotator 10.

For a given field strength, the amount of rotation produced by the ferrite rotator 10 is sensitive to relatively small changes in temperature. Hence, it may be found desirable to employ an automatic temperature control device whereby the temperature of the ferrite body 14 may be maintained substantially constant or at least the amount of rotation produced by the ferrite rotator 10 may be maintained substantially constant and at an appropriate, predetermined value. In accordance with this purpose, an automatic temperature control circuit is shown in Fig. 2 in combination with the ferrite rotator 10 which is shown in a broken sectional view comprising solenoid 24, potential source 26, heating coil 20, ferrite rotator 14 and the central portion 30 of waveguide 12. A thermocouple 120 is disposed or buried within the wall of the central portion 30 of the waveguide 12 in order to obtain a voltage proportional to the temperature of the medium immediately adjacent to the ferrite body 14. Power supply control means 122 are then shown connected to the thermocouple 120. Power supply control means 122 are connected to a power supply 124 which is in turn connected to the heating coil 20. A voltage is derived by power supply control means 122 which is proportional to the temperature of the atmosphere about the ferrite body 14 and the power supply 124 is thereby operated by power supply control means 122 automatically to increase or decrease the power supplied to heating coil 20 in accordance with changes in the temperature of the atmosphere adjacent the ferrite body 14.

The automatic control circuit of Fig. 2 may suffice in some cases; however, it may be more practicable in other cases to obtain a voltage proportional to the rotation of a wave produced by the ferrite rotator 10 to control a power supply. Such circuits are shown in combination with the ferrite rotator 10 of the present invention in Figs. 3 and 6. Referring now to Fig. 3, there is shown a side view of the ferrite rotator 10 including waveguide 12 having the input portion 32 and the output portion 34. A probe 130 is disposed at a predetermined point about the circumference of the output waveguide portion 34. A rectifier 132 is connected to the probe and a resistor 134, across which is connected a capacitor 135, is connected from the rectifier 132 to ground. In order to provide a control voltage, which is proportional to the difference between the actual amount of rotation of a wave passing through the ferrite rotator 10 and a predetermined desired amount of rotation, a biasing source of potential 136 is connected to a power supply control means 138 as is the positive terminal of resistor 134. A power supply 140 is then connected from power supply control means 138 to the terminals of the heating coil 20, not shown in Fig. 3.

Potential source 26 is again shown in Fig. 3 connected to the solenoid 24. A section of the output portion 34 of waveguide 12 is shown in Fig. 4 including the probe 130, rectifier 132, resistor 134, smoothing capacitor 135, and biasing source of potential 136. The lines 142 within the output waveguide portion 34 represent the electric flux lines of the electric field of a wave propagated in a $TE_{11}$ mode. Assuming the direction of polarization of the wave as represented by the lines 142 indicate the correct direction after the desired amount of rotation of the wave has been produced, an angle $\theta$ is employed to represent an error angle which is undesired. If $\theta$ is the error angle, then a curve of the output of rectifier 132, which may be a crystal rectifier, is indicated by curve 150 in Fig. 5. It is to be noted that curve 150 starts from zero at $$\theta = -\frac{\pi}{4} \text{ to a maximum at } \theta = +\frac{\pi}{4}$$

In order to make the feedback system of temperature control a null seeking system, an error voltage must be provided which is proportional to the magnitude of the error of phase rotation and also proportional to the algebraic sign of the error. Accordingly, potential source 136 provides a voltage $V_b$ as indicated in Fig. 5 whereby this is accomplished.

In the operation of the circuitry in combination with the ferrite rotator 10 in Fig. 3, the input portion 32 of the waveguide 12 is excited according to a certain mode of propagation. The ferrite rotator 10 then rotates the wave as it is passed through the central portion 30 of the waveguide 12, not shown. Upon reaching the output portion 34 of the waveguide 12, the probe 130 in conjunction with the rectifier 132 detects an error angle of rotation, if any exists. Biasing potential source 136 then normalizes this error making the input to power supply control means 138 proportional in algebraic sign and in magnitude to the error angle of rotation of the wave propagated in the output waveguide portion 34. Power supply control means 138 then controls power supply 140 in accordance with the error detected and accordingly heats the ferrite body 14, not shown in Fig. 3, to a temperature to compensate for the error in the amount of rotation produced by the ferrite rotator 10. Heating the ferrite body 14 thus avoids a substantial amount of attenuation by reducing the saturation magnetization of the ferrite body 14 whereby the frequency at which maximum attenuation occurs for the field strength necessary to provide the desired amount of rotation is reduced to a value substantially below the operating frequency of the ferrite rotator 10.

Figure 6:
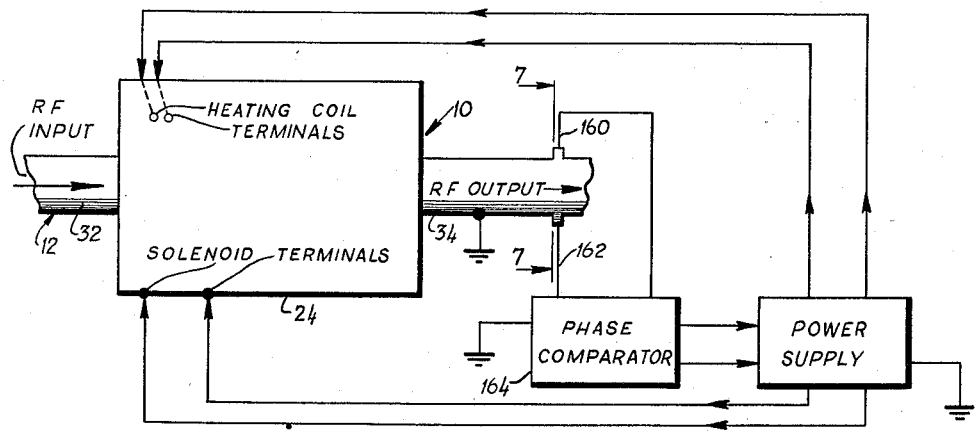
Fig. 6 is a schematic side view and circuit diagram of a ferrite rotator incorporating the present invention and utilizing control means and a phase sensing means different from that shown in Fig. 3 for controlling the temperature of the ferrite body thereof.
Figure 7:
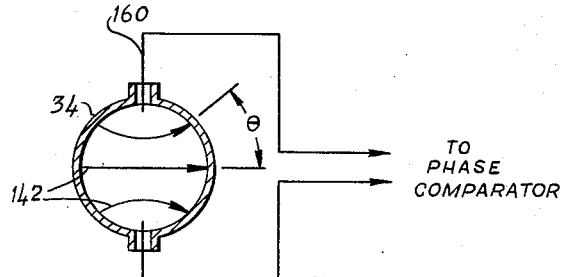
Fig. 7 is a sectional view on the line 7—7 of Fig. 6.

A similar automatic control system is shown in Fig. 6 where the ferrite rotator 10 is shown in a side view including the waveguide 12 having input and output portions 32 and 34 and solenoid 24. Because of the side view, the remaining elements of the ferrite rotator 10 are not shown. Two probes 160 and 162 are disposed 180 mechanical degrees about the output waveguide portion 34. These probes are connected to a phase comparator 164 which may be referenced to ground, as shown, as is the output waveguide portion 34. The phase of the signals picked up by the probes 160 and 162 are then compared with respect to a reference potential such as ground as shown. When the waveguide 12 is excited to propagate circularly polarized waves and a predetermined amount of rotation is desired, phase comparator 164 to which the probes 160 and 162 are connected may be employed to provide a voltage proportional in magnitude and in algebraic sign to the magnitude of the error angle of rotation from a predetermined and desired angle of rotation. This is indicated in Fig. 7 where the angle $\theta$ again is employed to indicate the error angle of rotation, the lines 142 indicating the electric field lines of the wave propagated within the waveguide 12. The section of the output waveguide portion 34 is shown in Fig. 7 with probes 160 and 162. The operation of the phase comparator 164 is old and well-known in the art. A power supply 166 is shown in Fig. 6 connected to the phase comparator 164 and in turn connected to the terminals of the heating coil 20, not shown, and of the solenoid 24. A pure heat control servo, which only controls the current through heating coil 20, is obviously very slow to respond. In order to compensate for small rotation errors, phase comparator 164 may thus be employed to control the power supplied to solenoid 24, whereby compensation may be produced by a change in field strength through the ferrite body 14, not shown. This vernier effect may have substantial utility when an average field strength somewhat below saturation is selected.

In the operation of the circuit with the ferrite rotator 10 shown in Fig. 6, a wave is propagated within waveguide 12 through the input portion 32 and rotated by ferrite rotator 10, and the error angle, if any, is detected by the probes 160 and 162. The phases of the signals picked up by the probes 160 and 162 are then compared in comparator 164 which gives an output signal proportional to the magnitude of the error angle $\theta$ indicated in Fig. 7 and proportional in algebraic sign to the error angle. Phase comparator 164 then controls the power supply 166 in response to the error angle at the output waveguide portion 34, and the heating coil 20 and solenoid 24, not shown, are supplied with more or less current as is needed to correct the error in the angle of polarization.

What is claimed is:

1. A rotator for rotating the plane of polarization of a linearly polarized electromagnetic wave comprising a waveguide, a ferrite body disposed within said waveguide, means for producing a unidirectional axial magnetic field through said ferrite body, means for heating said ferrite body to decrease the saturation magnetization of said ferrite body, whereby the frequency at which maximum attenuation occurs within said ferrite body may be reduced to a value below the operating frequency of said rotator, probe means inserted into said waveguide and disposed adjacent to the output end of said waveguide for detecting electromagnetic energy therein, means connected to said probe means for deriving a voltage proportional to the difference between the actual angle of rotation of said wave and a predetermined angle of rotation, and means coupled to said probe means for controlling said means for heating said ferrite body in response to changes in said voltage.

2. A rotator for rotating the plane of polarization of a linearly polarized electromagnetic wave comprising a waveguide, a ferrite body disposed within said waveguide, means for producing a unidirectional axial magnetic field through said ferrite body, means for heating said ferrite body to decrease the saturation magnetization of said ferrite body, whereby the frequency at which maximum attenuation occurs within said ferrite body may be reduced to a value below the operating frequency of said rotator, a probe inserted into said waveguide and disposed at a predetermined point about the circumference of said waveguide, a rectifier circuit, said probe being connected to said rectifier circuit and means connected to said rectifier circuit for controlling said means for heating said ferrite body in response to the deviations of the actual angle of rotation of said wave from a predetermined angle of rotation.

3. A rotator for rotating the plane of polarization of a linearly polarized electromagnetic wave comprising a waveguide, a ferrite body disposed within said waveguide, means for producing a unidirectional axial magnetic field through said ferrite body, means for heating said ferrite body to decrease the saturation magnetization of said ferrite body, whereby the frequency at which maximum attenuation occurs within said ferrite body may be reduced to a value below the operating frequency of said rotator, two probes inserted into said waveguide and disposed substantially 180 mechanical degrees from each other about the circumference of the output end of said waveguide, a phase comparator connected to said probes for producing an error correction voltage proportional to the difference between the actual angle of rotation of said wave and a predetermined angle of rotation, said phase comparator being connected to said means for heating said ferrite body to control said means for heating said ferrite body in accordance with the changes in said error correction voltage.

4. A rotator for rotating the plane of polarization of a linearly polarized electromagnetic wave comprising a waveguide, a ferrite body disposed within said waveguide, means for producing a unidirectional axial magnetic field through said ferrite body, means for heating said ferrite body to decrease the saturation magnetization of said ferrite body, whereby the frequency at which maximum attenuation occurs within said ferrite body may be reduced to a value below the operating frequency of said rotator, probe means connected to the output end of said waveguide and inserted through the wall thereof, means connected to said probe means for deriving a voltage proportional to the difference between the actual angle of rotation of said wave and a predetermined angle of rotation, and means coupled to said probe means for controlling said means for heating said ferrite body and said means for producing a unidirectional axial magnetic field in response to variations in said voltage.

5. A rotator for rotating the plane of polarization of a linearly polarized electromagnetic wave comprising a waveguide, a ferrite body disposed within said waveguide, means for producing a unidirectional axial magnetic field through said ferrite body, means for heating said ferrite body to decrease the saturation magnetization of said ferrite body, whereby the frequency at which maximum attenuation occurs within said ferrite body may be reduced to a value below the operating frequency of said rotator, means for deriving a voltage proportional to the operating temperature of said ferrite body, and control means connected to said means for producing a unidirectional axial magnetic field and to said means for deriving said voltage for operating said means for producing a unidirectional axial magnetic field in response to changes in said operating temperature.

References Cited in the file of this patent

UNITED STATES PATENTS

| | | |
|---|---|---|
| 2,434,255 | Bond et al. | Jan. 13, 1948 |
| 2,719,274 | Luhrs | Sept. 27, 1955 |
| 2,748,353 | Hogan | May 29, 1956 |

FOREIGN PATENTS

| | | |
|---|---|---|
| 511,649 | Belgium | June 14, 1952 |